Figure 3:
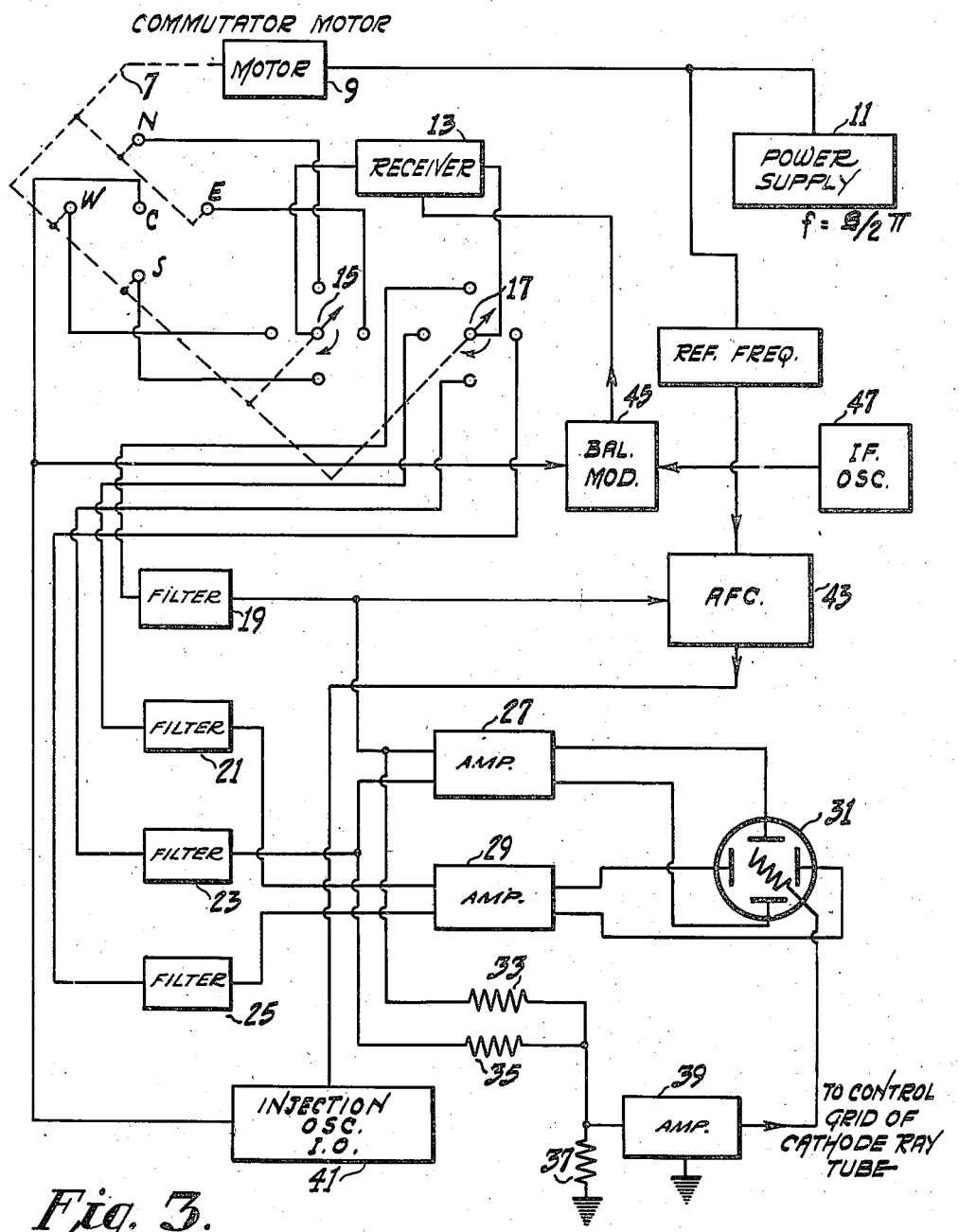

April 16, 1946.  L. E. NORTON  2,398,551
DIRECTION FINDER
Filed Dec. 31, 1942  2 Sheets-Sheet 1
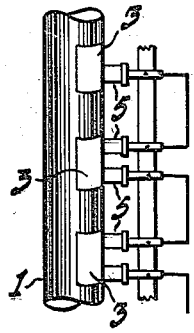
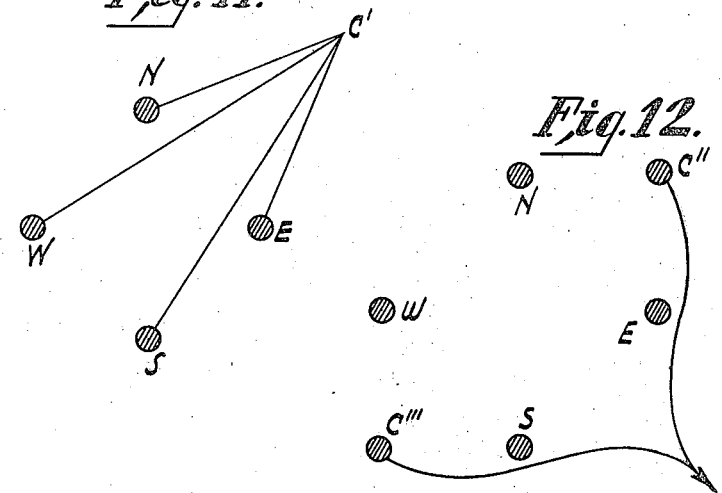
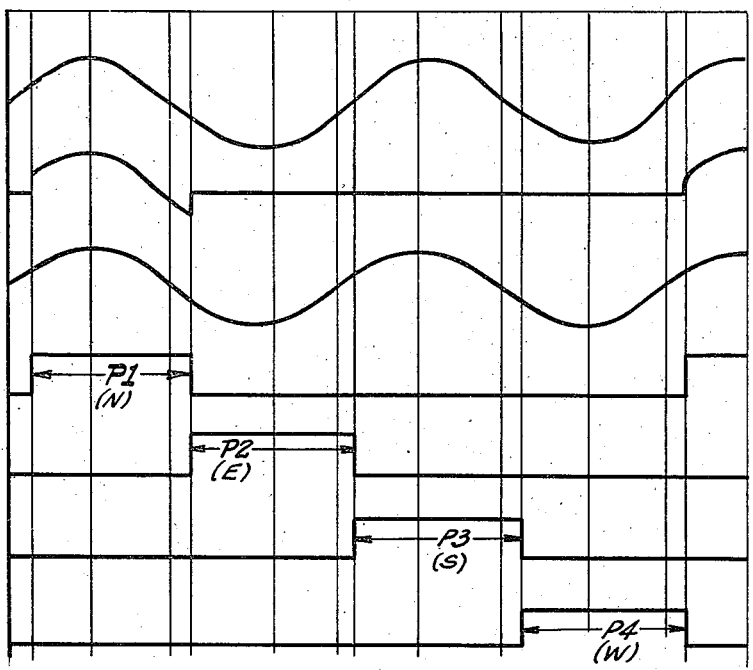
Inventor
LOWELL E. NORTON
By
Attorney Patented Apr. 16, 1946

2,398,551

UNITED STATES PATENT OFFICE 2,398,551

DIRECTION FINDER

Lowell E. Norton, Princeton, N. J., assignor to Radio Corporation of America, a corporation of Delaware Application December 31, 1942, Serial No. 470,859

11 Claims. (250—11)

This invention relates to direction finders, and more particularly to improvements in the art of determining the front of a radio wave by using spaced vertical antennas and comparing the phases of voltages induced in the several antennas by a radiation field.

This method has been practiced in the past by using pairs of antennas interconnected in opposition to each other and to a common load circuit, as in the well known Adcock system. Owing to the fact that the voltages from the individual antenna pairs are combined in opposition, their resultant amplitude is substantially proportional to their phase difference. Thus a phase comparison is obtained directly in the antenna circuits and the amplitude of the resultant output is substantially proportional to the cosine of the angle between the wave front of the radio wave and the perpendicular bisector of the line between the antennas. The principal reason for using systems of this type is to avoid response to other than vertically polarized waves, and so obtain freedom from so called polarization error or night effect. In order to utilize the full advantage of this arrangement it is necessary to take elaborate precautions to avoid pick up of horizontally polarized field components by any part of the antenna circuit. It has been found impossible in practice to achieve this result completely even when all horizontal surfaces in the system are either removed or shielded. Thus by process of elimination it appears that the residual response to non-vertically polarized energy must be a result of proximity of the pair or pairs of vertical antenna elements, since a single isolated vertical antenna will exhibit no such response.

According to the present invention, it is proposed to sample the radiation field at spaced points while avoiding antenna proximity effects by means of a plurality of sectionalized antenna structures. During the time that each of the antennas is operative, all of the other antennas are broken up into relatively small segments so that they are in effect removed from the field.

The principal object of the present invention is to provide an improved method of and means for radio direction finding.

Another object is to provide a method of and means for sampling a radiation field at spaced points without introducing errors due to antenna proximity effects.

A further object is to provide an improved method of and means for deriving continuous low frequency signals from the output of a commutated antenna.

These and other and incidental objects will become apparent to those skilled in the art upon consideration of the following description with reference to the accompanying drawings of which Figs. 1 and 2 are elevational and sectional views respectively of a commutated antenna structure, Fig. 3 is a schematic block diagram of an embodiment of the invention, Figs. 4, 5 and 6 are graphical representations of voltages occurring in the operation of the system of Fig. 3, Figs. 7, 8, 9 and 10 are graphical representations of the antenna switching cycles of the system of Fig. 3, and Figs. 11 and 12 are plan views illustrating alternative arrangements of the spaced antennas of the system of Fig. 3.

Referring to Fig. 1, a vertically disposed shaft I of insulating material is provided with a plurality of arcuate conductive segments 3 spaced apart longitudinally from each other and arranged to cooperate with stationary brushes 5. Each of the segments 3 extends through an arc of 90° around the shaft I, so that if the shaft is rotated past the brushes the segments 3 are connected together during ¼ of each revolution. When the segments 3 are connected together the assembly functions as a continuous vertical conductor. During the remainder of the revolution of the shaft I the segments 3 are disconnected from each other. The segments 3 and the connections between the brushes 5 are made so short that the natural resonance of each conductor is higher than the highest frequency at which the system is to operate. Four antennas of the above described type are provided at the corners of a square as in the familiar Adcock system. Each of the insulated shafts may be driven by an individual motor, or all may be driven together by means of suitable mechanical connection to a single motor, as schematically illustrated in Fig. 3. The antenna shafts are angularly displaced with respect to each other so that the structures are successively connected for operation in sequence. Referring to Fig. 7, the antenna N is operative during the period P1. The antennas E, S and W are operative during the periods P2, P3 and P4, as indicated by Figs. 8, 9 and 10 respectively. Since the antennas are operated successively, producing outputs in the form of staggered trains of fractional waves, a direct phase comparison is not possible. Hence it is necessary to synthesize voltages which are related in phase to each other in the same way as the outputs of the antennas would be related if they were coexistent.

Fig. 4 represents a low frequency sinusoidal potential, whose frequency is the difference in frequency between an arriving signal and a locally injected signal.

As explained below, the potential represented in Fig. 4 is:

$$E_e = C_1 E_a E_b \cos\left(\beta t + \frac{2\pi d \cos\theta \cos\psi}{\lambda} + \phi\right)$$

where all the directional information is in the phase angle $$\frac{2\pi d \cos \theta \cos \psi}{\lambda}$$

hereinafter referred to as $\gamma$. Thus $$E_e = c_1 E_a E_b \cos(\beta t + \gamma + \phi)$$

The frequency $\beta/2\pi$ will be referred to as the modulation frequency. Assuming that the antenna switching repetition frequency is one-half the modulation frequency, each antenna will be operative for a period equal to that of one-half wave of the modulation cycle. Referring to Fig. 5, if an antenna is made operative at a time $a\pi$ after the initiation of a modulation cycle, the output, after demodulation, will comprise a fractional wave repeated at intervals corresponding to the switching repetition period. This wave includes a fundamental frequency which is the same as the switching repetition frequency, a second harmonic of the same frequency as the modulated frequency, and numerous higher harmonics. The modulation frequency components or second harmonics may be isolated by means of a filter comprising reactive elements arranged to reject all other components. The selected second harmonic component of the wave of Fig. 5 will be of the same form as the modulation frequency component of Fig. 4. The filter output is illustrated in Fig. 6. A similar filter may be provided for each antenna channel, and the phases of the filter output voltages compared to provide bearing indications. Since there is no assurance that the switching cycle will remain in a constant phase relation with the modulation cycle, it is necessary that the phase of the modulation component of the wave of Fig. 5 be independent of the angle $a\pi$. Expressing the voltage $E_5$ of Fig. 5 in terms of a Fourier series:

$$E_5 = a_0 + a_1 \sin \frac{(\beta t + \gamma)}{2} + a_2 \sin(\beta t + \gamma) + \ldots$$

$$\ldots a_n \sin \frac{n(\beta t + \gamma)}{2} + b_1 \cos \frac{(\beta t + \gamma)}{2} +$$

$$b_2 \cos(\beta t + \gamma) + \ldots b_n \cos \frac{n(\beta t + \gamma)}{2}$$

where $\beta/2\pi$ = the switching frequency, the terms $a_2 \sin(\beta t + \gamma)$ and $b_2 \cos(\beta t + \gamma)$ represent the second harmonic or modulation frequency component. The constant $a_2$ may be evaluated by multiplying the series by $\sin(\beta t + \gamma)$ and integrating over one cycle of the repetition frequency:

$$a_2 = \frac{1}{a\pi} \int_0^{a\pi} 0 \sin(\beta t + \gamma) d\frac{(\beta t + \gamma)}{2} +$$

$$\frac{2}{\pi} \int_{a\pi}^{a\pi + \pi/2} \sin(\beta t + \gamma) \sin(\beta t + \gamma) d\frac{(\beta t + \gamma)}{2} +$$

$$\frac{2}{(3-2a)\pi} \int_{a\pi + \pi/2}^{2\pi} 0 \sin(\beta t + \gamma) d(\beta t + \gamma) = \frac{2}{4} = \frac{1}{2}$$

The constant $b_2$ may be similarly determined:

$$b_2 = \frac{1}{a\pi} \int_0^{a\pi} 0 \cos(\beta t + \gamma) d\frac{(\beta t + \gamma)}{2} +$$

$$\frac{2}{\pi} \int_{a\pi}^{a\pi + \pi/2} \sin(\beta t + \gamma) \cos(\beta t + \gamma) \frac{d(\beta t + \gamma)}{2} +$$

$$\frac{2}{(3-2a)\pi} \int_{a\pi + \pi/2}^{2\pi} 0 \cos(\beta t + \gamma) d\frac{(\beta t + \gamma)}{2} = 0$$

The phase angle between $E_5$ and $E_6$ is $$\tan^{-1} \frac{b_2}{a_2} = \tan^{-1} 0 = 0$$

Thus the phase angle between the modulation and the second harmonic of the wave of Fig. 5 is zero, when the switching cycle starts at a time $a\pi$ later than the modulation cycle. Since this is true for any value of $a$, it is apparent that the phase relation of $E_4$ to $E_6$ is independent of the switching phase.

Referring to Fig. 3, four antennas N, E, S and W are arranged at the corners of a square and mechanically connected, as schematically indicated by the dashed lines 7, to a synchronous motor 9, which is electrically connected to an A.-C. supply 11. A receiver 13 is connected to a switch 15 which is arranged to be driven by the motor 9 to connect the receiver to the antennas in sequence corresponding to the commutation cycle. A second switch 17 is provided in the output circuit of the receiver 13 to connect the receiver successively to a plurality of filters 19, 21, 23 and 25. The outputs of the filters 19 and 23 are connected in opposition to the input circuit of an amplifier 27. The filters 21 and 25 are similarly connected to an amplifier 29. The output circuit of the amplifier 27 is connected to one deflection circuit of the cathode ray tube 31 and the amplifier 29 is connected to the other deflection circuit. The outputs of the filters 19 and 23 are additively combined in a network comprising resistors 33, 35 and 37 and applied through an amplifier 39 to the control grid circuit of the cathode ray tube 31.

A small antenna C is provided at the center of the antenna array and is connected to an oscillator 41. An automatic frequency control circuit 43 is connected between the filter 19, the A.-C. supply 11 and the oscillator 41. The receiver 13 is of the superheterodyne type. The usual local oscillator for frequency changing is omitted and the beating frequency is supplied from a balanced modulator 45 which is connected to the oscillator 41 and to an oscillator 47.

The injection oscillator 41 is adjusted to provide an output differing in frequency from the carrier of the arriving signal by an amount approximately equal to the power supply frequency. The output of the oscillator 41 is radiated from the antenna C, and is picked up together with the arriving signals, by the antennas N, E, S and W. The A. F. C. system then adjusts the frequency of oscillator 41 to a value differing from the carrier frequency by exactly the power frequency. If the antennas were in action continuously, the field at antennas N and S would produce two potentials:

$$E_a \left\{ 1 + m \sin \left( \omega t - \frac{2\pi d \cos \theta \cos \psi}{\lambda} \right) + m_1 \sin[(\omega + \beta)t + \phi] \right\}$$

and $$E_a \left\{ 1 + m \sin \left( \omega t + \frac{2\pi d \cos \theta \cos \psi}{\lambda} \right) + m_1 \sin[(\omega + \beta)t + \phi] \right\}$$

respectively, where $E_a$ is the signal amplitude, $m$ and $m_1$ are modulation factors, $\omega/2\pi$ is the signal carrier frequency, $d$ is the spacing between the antennas N and S, $\theta$ is the azimuth of wave arrival with respect to the line between the antennas N and S, $\psi$ is the elevation of wave arrival, $\lambda$ is the wavelength of the arriving wave, and $\phi$ is a constant.

The injection oscillator 41 provides a multiplying voltage $E_b(1 + m_2 \sin \alpha t)$. The output voltage of the I.-F. amplifier of the receiver 13, when connected to the antenna N, will be $$Ed = \frac{mm_2}{2} E_a E_b \left\{ \cos\left[(\alpha-\omega)t + 2\pi \frac{d \cos\theta \cos\psi}{\lambda}\right] + \cos[(\alpha-\omega-\beta)t - \phi] \right\}$$

The second detector of the receiver 13 will then establish a potential:

$$E_e = C_1 E_a E_b \cos\left(\beta t + \frac{2\pi d \cos\theta \cos\psi}{\lambda} + \phi\right)$$

Similarly, the receiver 13 will produce, when connected to the antenna S, a voltage $$E_f = c_1 E_a E_b \cos\left(\beta t - \frac{2\pi \cos\theta \cos\psi}{\lambda} + \phi\right)$$

Thus the combined signals are mixed by the action of the second detector of the receiver 13, providing output waves of the form illustrated in Fig. 5. The antennas N, E, S and W are operated consecutively, each for a period equal to one fourth of the switching repetition period. The filters 19, 21, 23 and 25 are tuned to accept the power frequency components, as described above. The outputs of the filters thus comprise sinusoidal waves bearing the same phase relations with respect to each other as the R.-F. voltages induced in the corresponding antennas bear to each other. The phases of the outputs of the filters 19 and 23 are compared in the input circuit of the amplifier 27 to provide an A.-C. voltage proportional in magnitude to the sine of the bearing. The outputs of the filters 21 and 25 are similarly combined in the amplifier 29 to provide a second voltage of the same frequency proportional in amplitude to the cosine of the bearing. The outputs of the amplifiers 27 and 29 are in time phase. The cathode ray beam of the tube 31 is therefore deflected to produce a linear trace at an angle equal to the bearing angle. In order to remove the reciprocal bearing indication, the trace is blacked out or defocused over one-half its length by applying the sum of the outputs of the filters 19 and 23 to the intensity control electrode.

The automatic frequency control circuit 43 comprises a discriminator arranged to respond to the difference between the power supply frequency and the frequency of the output of the filter 19, and adjust the frequency of the injection oscillator 41 to reduce this difference to zero. This maintains the output of the oscillator 41 at a frequency differing from that of the received carrier by exactly the power frequency. The use of radiation injection has the advantage of eliminating errors due to random phase shift characteristics of the antenna circuits, since both the received carrier voltages and the injected signal voltages are shifted by substantially the same amount in each antenna circuit.

The balanced modulator 45 produces an output voltage of a frequency which is equal to the difference between the frequency of the injection oscillator 41 and the frequency of the oscillator 47. The oscillator 47 is adjusted to operate at the I.-F. frequency of the receiver 13.

The modulator 45 thus provides a voltage of the proper frequency to beat the received signal to the I.-F. frequency. To change the frequency of operation of the system it is only necessary to tune the injection oscillator 41 to approximately the desired frequency. The automatic frequency control 43 will then adjust the oscillator 41 to the exact frequency in response to the output of the filter 19.

Numerous circuit variations are possible. For example various ratios of modulation frequency to commutation frequency may be chosen with correspondingly different harmonics selected to obtain the condition that the phase of the filter outputs be independent of the switching phase. In order to provide satisfactory operation on slow speed telegraphy signals, it is necessary to operate the system at a high enough rate to provide a steady bearing indication. The antenna commutation must be limited to a relatively low speed because of mechanical considerations. If the power frequency is multiplied by some integral coefficient $n$ and a correspondingly higher harmonic is selected by the filters, the operation will be exactly as described above except at a higher rate, provided that if commutation frequency is $\beta/4\pi$, the modulation frequency is $n\beta/2\pi$, so that correct bearing indications will be produced even though the signal may be interrupted during the antenna commutation cycle.

The injection antenna C of the system of Fig. 3 may be removed from its central location and placed at some outside location as shown in Fig. 11, provided that phase shifters corresponding to the altered geometry are placed in the channels of the filters 19, 21, 23 and 25. The path C'N is the shortest and for convenience is used as a reference. If a phase advance equal to $2\pi/\lambda$ times the differences in the lengths of the paths C'—N and C'—E is introduced in the channel of the filter 19, a phase advance of $2\pi/\lambda$ times the difference between the paths C'S and C'E is introduced in the channel of filter 23, and a phase advance of $2\pi/\lambda$ times the difference between the path C'W and C'E in the channel of the filter 25, the operation will be the same as in the above described system. The central antenna may be replaced by two antennas C'' and C''' as illustrated in Fig. 12, located equidistant from the center point 0, and on a line which passes through the point 0. The mean phase of the pair will be the same as the phase at 0.

Mean phase voltage for eliminating reciprocal bearing indications may be obtained without the use of central sense antenna by modifying the antenna switching sequence, to include periods wherein two or more antennas operate simultaneously. The filter output during these periods will be mean phase voltage. The relation between the commutation frequency and the modulation frequency must be changed to conform to the new switching sequence. For example, if the switching sequence is N, N—S, E, E—W, S, N—S, W, E—W, the modulation frequency must be $n\beta t/2\pi$ where the commutation frequency is $\beta/4\pi$ and $n$ is any real integral number. The sense period may be repeated, once for each complete commutation cycle rather than four times. Thus the switching sequence may be N, E, S, W, N—S. In this case if the commutation frequency is $\beta/4\pi$ the modulation frequency must be $5n\beta/8\pi$. In each of the above cases, the sense voltage may be derived from either diagonal pair or from all of the antennas connected simultaneously.

Thus the invention has been described as a method of direction finding in which erroneous indications due to abnormally polarized or steeply incident radiation is avoided by preventing response to any other than vertical electric field components. This is accomplished by use of antenna structures which may be commutated cyclically to change their electrical characteristic from those of a vertical conductor to those of a plurality of relatively short isolated conductors. The antennas are commutated successively, so that only one antenna at a time is operative, the other antennas being effectively removed from the field. This prevents response to horizontally polarized field components which would otherwise occur as a result of antenna proximity effects.

I claim as my invention:

1. A radio direction finder comprising a plurality of spaced antenna structures each comprising a series of isolated conductors of relatively short length compared to the wave length of the highest frequency at which the system is to operate, commutator means arranged to connect said conductors to form a single vertical conductor, means for driving said commutators to select successive ones of said spaced antenna structures, receiver means connected to each of said antennas, filter means connected in the output circuit of said receiver means and arranged to select voltages of a modulation frequency related to the frequency of commutation of said antennas so as to provide an output which is independent in phase of the phase of said commutation and indicator means connected to said filter means.

2. A radio direction finder comprising a plurality of spaced antenna structures each including a series of isolated conductive segments of relatively short length compared to the wave length of the highest frequency at which the system is to operate and commutator means arranged to connect the segments of said structure to form a single vertical conductor, means for operating said commutators to connect together periodically the segments of each of said structures successively whereby vertical conductors are sequentially set up at spaced points, receiver means connected to said antenna structures, filter means connected to said receiver means, and phase responsive indicator means connected to said filter means.

3. The invention as claimed in claim 2, including a local source of radiation arranged to operate at a frequency different from the carrier frequency of an arriving wave by an amount which is related to the frequency of antenna commutation by the factor $2n$, where $n$ is any real integral number.

4. The method of direction finding which comprises the steps of radiating energy at a frequency differing from that of the carrier of an arriving wave; sampling the resultant radiation field at a plurality of spaced points in succession to derive successive wave trains corresponding to the field at said points, separately demodulating said wave trains, filtering each of said demodulated wave trains to isolate therefrom a component equal in frequency to the difference between the frequency of said locally radiated signal and the frequency of said arriving wave, and comparing the phases of said isolated components.

5. The invention as claimed is claim 2 including a local source of radiation arranged to operate at a frequency differing from that of the frequency of an arriving wave by an amount so related to the frequency of antenna commutation that the phase of said filtered receiver output is independent of the phase of said antenna switching.

6. The invention as claimed in claim 2 including a local source of radiation arranged to operate at a frequency differing from that of the frequency of an arriving wave by an amount so related to the frequency of antenna commutation that the phase of said filtered receiver output is independent of the phase of said antenna switching, an automatic frequency control circuit connected to control the frequency of said source of local radiation in response to the difference between said frequency of said filtered receiver output and that of a reference voltage of fixed frequency.

7. The invention as claimed in claim 2 wherein said indicator means comprises a cathode ray tube including an intensity control electrode, and means for energizing said electrode in accordance with the mean phase of the output voltages of said filter means.

8. A directive antenna array including a plurality of antenna structures located at spaced points, each comprising a series of isolated conductive segments of relatively short lengths compared to the wavelength of the highest frequency at which the system is to operate and commutator means arranged to connect the segments of said structure to form a single vertical conductor.

9. A directive antenna array including a plurality of antenna structures located at spaced points, each comprising a series of isolated conductive segments of relatively short lengths compared to the wavelength of the highest frequency at which the system is to operate, cyclically operable commutator means provided on each of said structures and arranged to be operated from a common source of control energy so as to connect the segments of each of said structures in succession to form a single vertical conductor at each of said spaced points in sequence.

10. An antenna structure comprising a series of spaced conductive segments of relatively short lengths compared to the wavelength of the highest frequency at which said structure is to operate, and commutator means comprising a plurality of spaced conductors, electrically isolated from each other, arranged to connect said segments together to form a single vertical conductor.

11. An antenna structure comprising a shaft of insulating material, a series of segments of conductive material supported on said shaft and spaced apart longitudinally thereof, a plurality of stationary brush means provided adjacent said shaft in positions such that each of said segments periodically bridges a respective pair of said brushes upon continuous rotation of said shaft, and direct connections between each of said brushes and the nearest brush of the adjacent pair of brushes, whereby said segments are cyclically connected together to form a single vertical conductor upon rotation of said shaft.

LOWELL E. NORTON.